United States Patent [19]

Silverman et al.

[11] Patent Number: 5,249,241
[45] Date of Patent: Sep. 28, 1993

[54] REAL-TIME AUTOMATED SCENE DISPLAY FOR INFRARED CAMERAS

[75] Inventors: Jerry Silverman, Waban; Jonathan Mooney, Waltham; William Ewing, Stow, all of Mass.; Darryl Sato, San Diego, Calif.

[73] Assignee: The United States of America as represented by the Secretary of the Air Force, Washington, D.C.

[21] Appl. No.: 728,907

[22] Filed: Jul. 9, 1991

[51] Int. Cl.$^5$ .............................................. G06K 9/38
[52] U.S. Cl. ..................... 382/51; 250/330; 382/18; 382/54; 382/56
[58] Field of Search .................. 382/51, 6, 54, 1, 18, 382/56, 9, 50; 250/330

[56] References Cited

U.S. PATENT DOCUMENTS

| | | | |
|---|---|---|---|
| 4,656,665 | 4/1987 | Pennebaker | 382/51 |
| 4,670,653 | 6/1987 | McConkle et al. | 250/330 |
| 4,695,884 | 9/1987 | Anastassiou et al. | 382/51 |
| 4,719,350 | 1/1988 | Alm | 250/330 |
| 4,741,046 | 4/1988 | Matsunawa et al. | 382/9 |
| 4,792,979 | 12/1988 | Nomura et al. | 382/51 |
| 4,804,842 | 2/1989 | Nakajima | 382/51 |
| 4,856,528 | 8/1989 | Yang et al. | 128/653 |
| 4,975,970 | 12/1990 | Zettel et al. | 382/51 |
| 5,053,888 | 10/1991 | Nomura | 382/54 |
| 5,063,607 | 11/1991 | Fitzhenry et al. | 382/51 |
| 5,123,060 | 6/1992 | Cho et al. | 382/51 |

*Primary Examiner*—Joseph Mancuso
*Attorney, Agent, or Firm*—William G. Auton; Donald J. Singer

[57] ABSTRACT

A histogram projection system which automatically optimizes, tracks changes in luminance and adjusts in real time the display of wide dynamic range imagery from IR cameras. It is computationally simpler than and offers markedly superior results to the standard available technique for this purpose, histogram equalization. The new technique assigns display dynamic range equally to each occupied intensity level in the raw data in contrast to the old procedure which assigns dynamic range in proportion to the number of pixels at given levels. Less shot noise and greater resolution of image detail for smaller objects or targets are the main improvements from the new algorithm. By the expedient of undersampling the image pixels in carrying out the histogram processing, one can in effect gradually increase the degree of dynamic range assigned to majority or background pixel levels, thereby enhancing the contrast in background regions when desired.

23 Claims, 6 Drawing Sheets

IR SIGNAL HISTOGRAM
200

OCCUPIED (BINARY) LEVEL HISTOGRAM
210

COMPRESS EMPTY LEVELS
220

SCALE TO VIDEO DISPLAY RANGE
230

FINAL DISPLAY HISTOGRAM
240

REAL-TIME AUTOMATED SCENE DISPLAY FOR INFRARED CAMERAS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to infrared (IR) cameras, and more specifically the invention pertains to a histogram projection system which automatically optimizes, tracks changes in luminance and adjusts in real time the display of wide dynamic range imagery from IR cameras.

The task of providing a histogram projection system which automatically tracks changes in luminance to adjust the display of wide dynamic range IR imagery is alleviated, to some extent, by the systems disclosed in the following U.S. patents, the disclosures of which are incorporated herein by reference:

U.S. Pat. No. 4,656,665 issued to Pennebaker;
U.S. Pat. No. 4,670,653 issued to McConkel;
U.S. Pat. No. 4,719,350 issued to Alm;
U.S. Pat. No. 4,741,046 issued to Matsunawa; and
U.S. Pat. No. 4,856,528 issued to Yang.

The patent to Pennebaker describes a system for thresholding images to reduce the information content using histogram analysis. The patent to McConkle teaches an infrared detection and imaging system. The patent to Alm describes a radiation imaging enhancement system employing a feedback loop to obtain an average value detection signal and a reference signal. The patent to Matsunawa teaches a histograming method discriminating picture wherein the picture is binary coded. The patent to Yang teaches a histograming method in a CT image in medical applications.

It is common for IR cameras to rely on manual gain and offset adjustment to obtain a real-time mapping of IR signals to the display values. The manual adjustment gives an excellent view in general of the useful IR information in a scene, but it requires frequent readjustment as the camera is panned or if the IR luminance changes (sun goes behind a cloud for example). Moreover as a linear process, the manual offset/gain expends, so to speak, useful dynamic range on empty levels within the histogram or information range of the IR levels. Two alternative candidates, which we have considered, for implementing automatic adjustment are direct scaling and histogram equalization.

Direct scaling (also called "black level and gain") requires that the histogram of each frame be analyzed to set a "black" and "white" level. The optimum way to do this is scene and application dependent and requires either a user interactive parameter in the implementation or a plethora of choices. In either case, more complexity is involved than with the new algorithm described below. Further, as with the manual adjustment to which it is closely analogous, one is still faced with the disadvantage cited above for a linear process.

The familiar technique, described in text books, of "histogram equalization" assigns dynamic range to each occupied level in proportion to how many pixels are at that level. Extensive simulations in software on actual imagery: indoor and outdoor; day and night, show that due to the nature of IR histograms, histogram equalization amplifies shot noise and loses gray scale resolution for smaller (usually hotter) objects in the scene. The purpose of the present invention is to avoid this pitfall.

SUMMARY OF THE INVENTION

The present invention includes an infrared signal processing system which uses an infrared camera, a microprocessor, and an 8 bit monitor to display the IR scenes.

The dynamic range of a signal such as an image is a measure of how many increments or steps of meaningful information are contained in the signal with noise considered. Commercially available IR cameras output IR data signals with 4095 (12 bits) levels of intensity, but commercially available monitors only display signals with 256 levels of intensity (8 bits). The function of the microprocessor is therefore twofold. First, it maps the 12 bit levels of IR data signals into commensurate 8 bit levels for the display monitor. Mapping a mathematical correlation of the 12 bit signals into an 8 bit scale is accomplished as described below.

The second and more interesting process performed by the microprocessor adds a programmable flexibility to the 12 bit to 8 bit mapping by means of an undersampling feature. The first step in using histogram projection is to determine which of the possible raw signal levels from 0 to 4095 are in fact present (occupied) in the image. If one uses less than all the pixels (undersample) in determining these occupancy statistics, say every 2nd, 4th, 8th etc pixel, one can gradually shift the allocated dynamic range on the 8 bit displacy to the more densely occupied pizel levels, usually the background. In an IR scene, the background is usually at ambient temperature such as ground or foliage and creates the densely occupied levels. Smaller objects in the scene if cooler or warmer that the background create the sparsely occupied pixel levels. If these smaller objects are of interest, maximum display dynamic range can be assigned to them by low undersampling, while if one is more interested in background details, one can assign more dynamic range to these elements of the scene by a higher degree of undersampling. Hence the algorithm can easily adapt to the imagery.

It is an object of the present invention to provide an IR data processing system with adjustable allocation of dynamic range.

It is another object of the present invention to provide an IR signal processing system which automatically maps 12 bit IR data signals into 8 bit levels for display.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a histogram projection system for mapping the histogram of "raw" scene data of 12 bit IR cameras to produce a display scene data stream which automatically optimizes and adjusts changes in luminance to display a wide dynamic range of IR imagery. The principle of the present invention in its purest form is to assign the display dynamic range of an IR scene equally to each occupied level regardless of how many pixels are at that level. This differs from the prior art histogram equalization, approach, which allocates display dynamic range according to the number of pixels at each level. The present invention also replaces the manual gain and offset adjustment procedures used with IR cameras to provide automatic optimized mapping of IR display signals.

IR camera systems produce IR data signals with 12 bit levels of illumination. This means each pixel intensity ranges between 0–4095 levels (since $2^{12}=4096$). Typical displays used are 8 bit devices, in which each pixel intensity ranges between 0–255 levels (since $2^8=256$).

Figure 1:
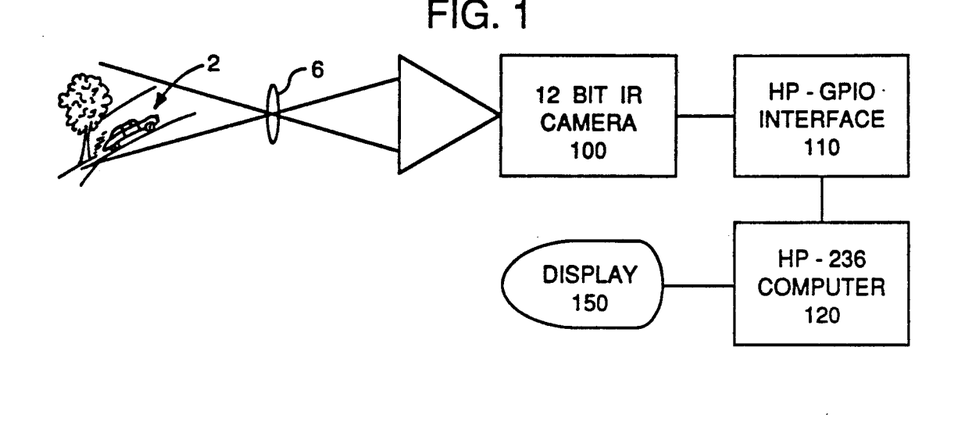
FIG. 1 is an illustration of the infrared signal processing system elements used in the present invention.

The present invention provides automatic mapping of 12 bit IR data signals into 8 bit IR display values with a contrast adaptation feature which results from using two separate concepts: mapping and under sampling. Mapping is simply a conversion which allows 12 bit IR data to be converted into an 8 bit representation. Undersampling involves dropping the sparsely occupied pixel levels in assigning the display dynamic range. Undersampling causes an increase in the dynamic range assigned to the background and tends to enhance the contrast of the background regions in a controlled manner. The best features of mapping and undersampling yield an optimum display of objects of interest in an IR scene. The reader's attention is now directed towards FIG. 1, which is a block diagram of an IR histogram projection system which uses the present invention. In FIG. 1, an image 2 is focused through a lens 6 into a 12 bit IR camera 100. This camera can be any commercially available system such as one produced by the David Sarnoff Research Labs of New Jersey. The analog electrical output of the camera 100 is converted into a 12 bit digital signal by the interface 110 for the computer 120. The computer 120 performs a three step process to convert the 12 bit raw data into an 8 bit mapped display signal for the display. First, it determines a binary histogram by counting the occupied levels of the raw data. Second, it maps the 12 bit digital signal from the IR camera into an 8 bit display signal useable by the display 150, and writes a look-up table. Third, the raw data is mapped into the actual display values using the look-up table to produce the display signal for the display.

Figure 2:
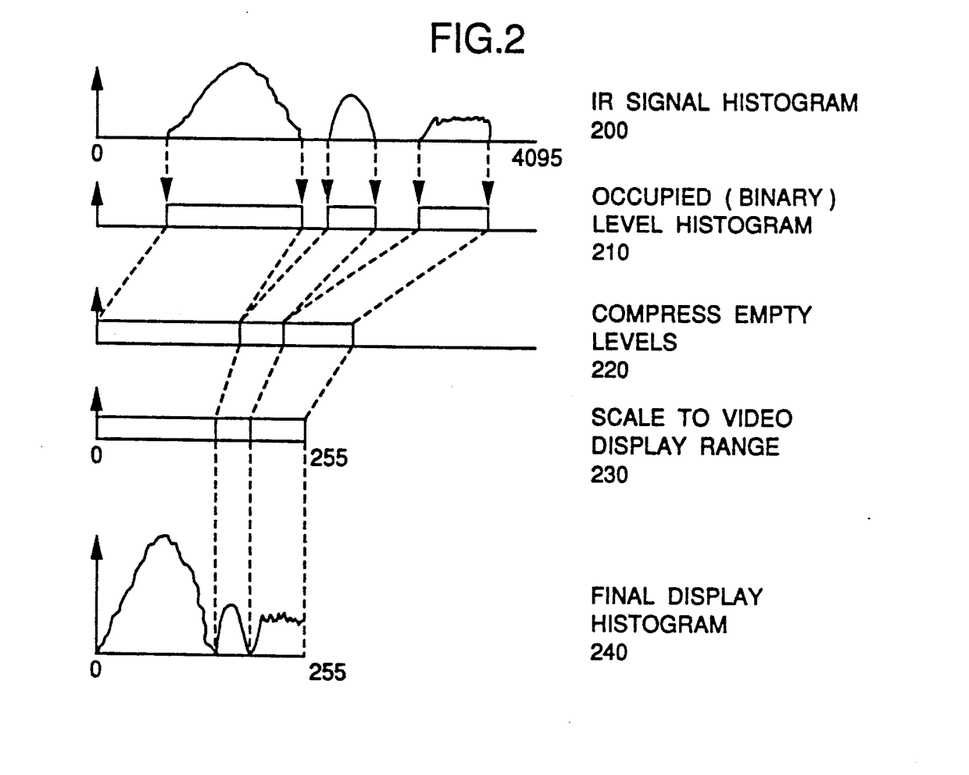
FIG. 2 is an illustration of the mapping process that converts 12 bit data signals into scaled 8 bit display signals.
Figure 3:
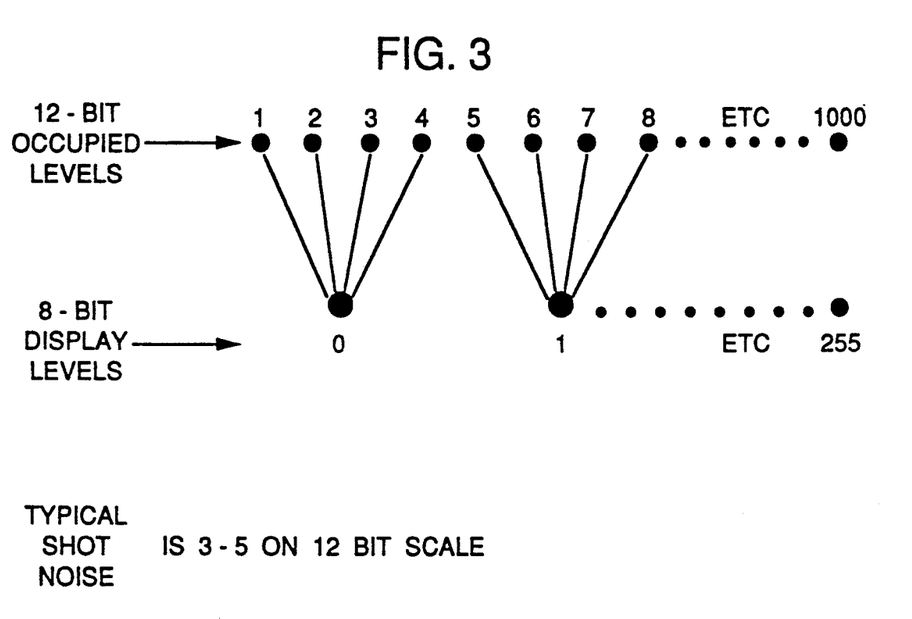
FIG. 3 is an example of mapping of 12 bit data signals into 8 bit display signals.

The reader's attention is now directed towards FIG. 2, which is a schematic representation of how the new algorithm, named, histogram projection (HP) maps the histogram of "raw" scene data (12-bits in present IR cameras) into a resulting histogram of the displayed scene (8-bits for high quality monitors). The procedure simply requires computing the binary histogram of the image (or each frame in live imagery), i.e. which of the possible levels from 0 to 4095 (12-bits) are occupied by at least one pixel. To display the image, these occupied levels only are mapped or projected into the 256 available 8-bit display levels. An example of the mapping from 12 to 8-bits is shown in FIG. 3 for the case where 1000 levels out of a possible 4096 are occupied.

To implement the HP algorithm in software, one computes the binary histogram of the image and converts the result to a function, $B[i]$, where for 12-bit images i goes from 0 to 4095. $B[i]=1$ for occupied states and $=0$ otherwise. Each occupied level is then given an order number n which goes from 1 to N with N being the total number of occupied levels. A pixel on the 12-bit scale at occupied level i with order number n is displayed at the gray level=$[255 \times n/N]$ on the 8-bit display scale, where the brackets denote the next lower integer.

Extensive tests have been performed on image frames taken with a 240 by 160 PtSi array Schottky barrier IR camera. These images included day and night, indoor and outdoor scenes and clearly demonstrate the superiority of HP to other possible alternatives for replacing manual adjustment, such as histogram equalization.

As illustrated in FIG. 2, the implementation of the HP algorithm is performed in three parts: 1) determine the binary histogram 210, 2) perform the "projection" operation, namely the mapping from 12 to 8-bits, and write the transformation to a look-up table 220 and 3) map the raw data to the display through the look-up table 230. The entire operation occurs over a two frame duration (1/30 of a second). As the pixel data of a frame is fed into the processor, it is both stored in a frame buffer and used to determine the binary histogram. The processor ceases to compile the histogram after ¾ of the frame has been read in and begins to perform the projection mapping. The projection or mapping step is complete by the end of the first frame and is used to update the look-up table. During the second frame, data is retrieved from the frame buffer, passed through the look-up table and is displayed (simultaneously the operations just described are also being performed).

As indicated above, the projection mapping is naturally expressed with integer division. However, instead of performing many time consuming divisions, one can use successive subtractions. The process is further expedited by taking advantage of the fact that we need only to calculate a display gray level for each value of n from 1 to N. Hence we can increment n from 0 to N performing a total of (N+256) subtractions.

Figure 4:
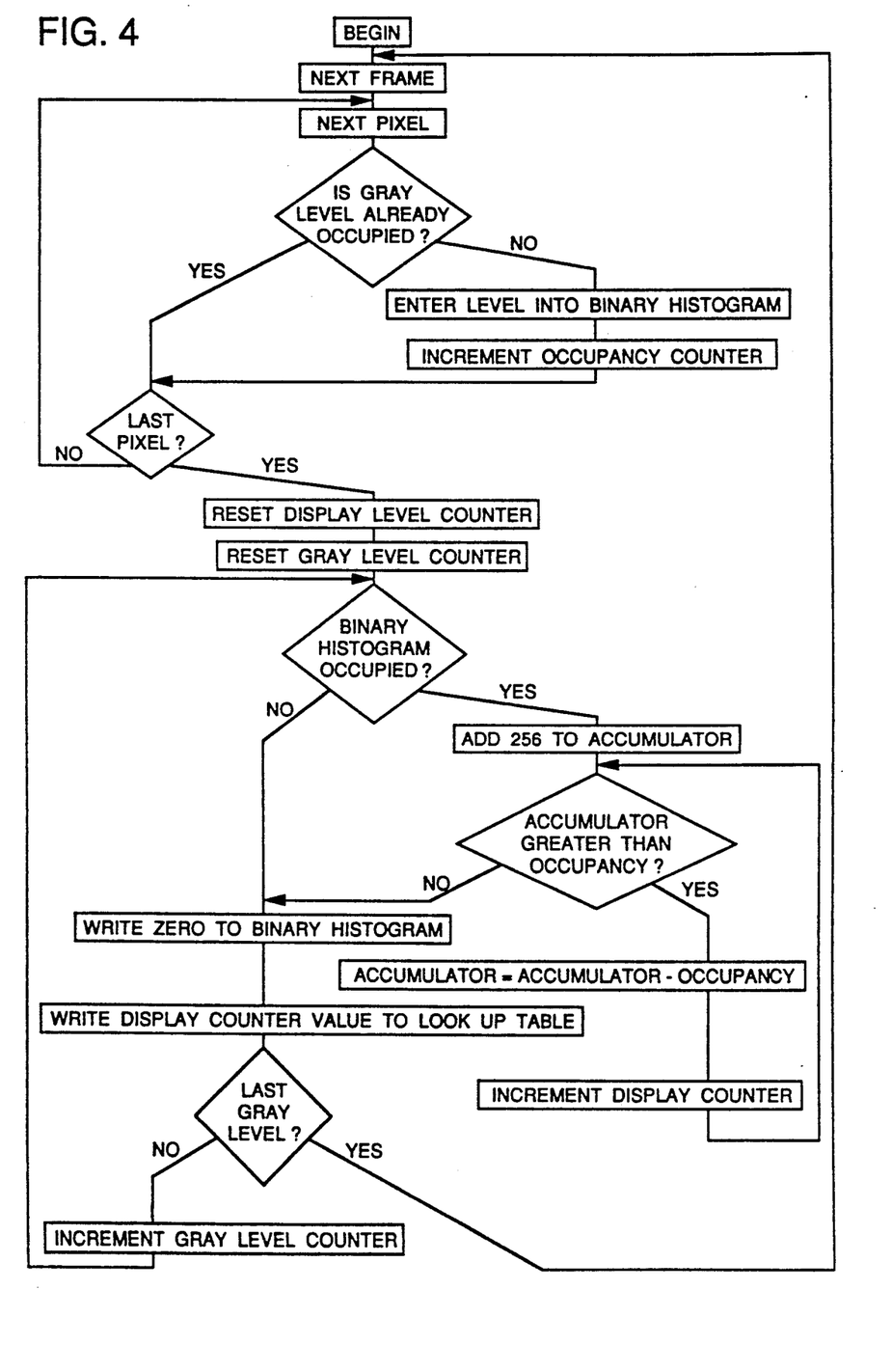
FIG. 4 is a block diagram of the flowchart of the histogram projection system used in the present invention.
Figure 5:
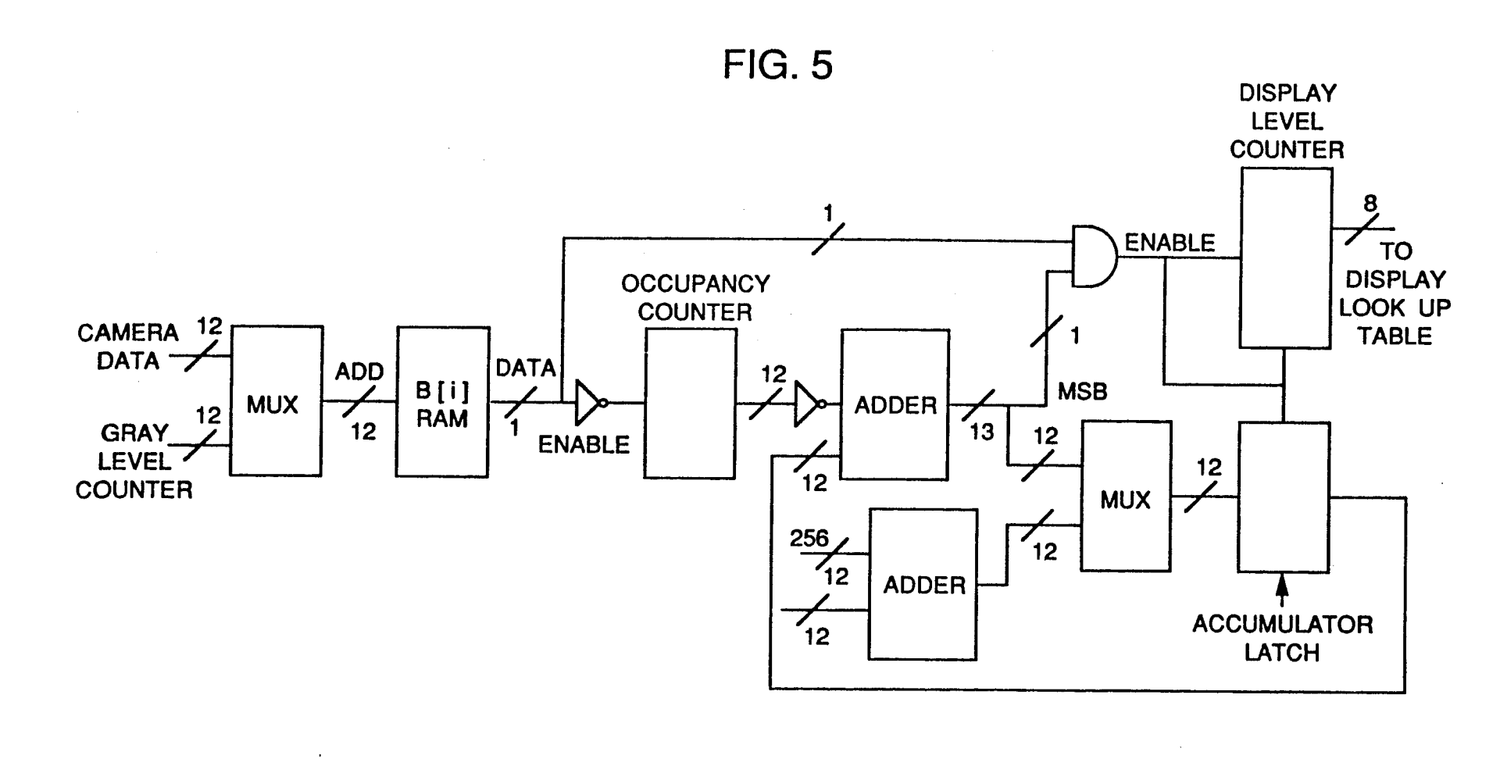
FIG. 5 is an electrical schematic of the hardware which can perform the process displayed in FIG. 4.
Figure 6:
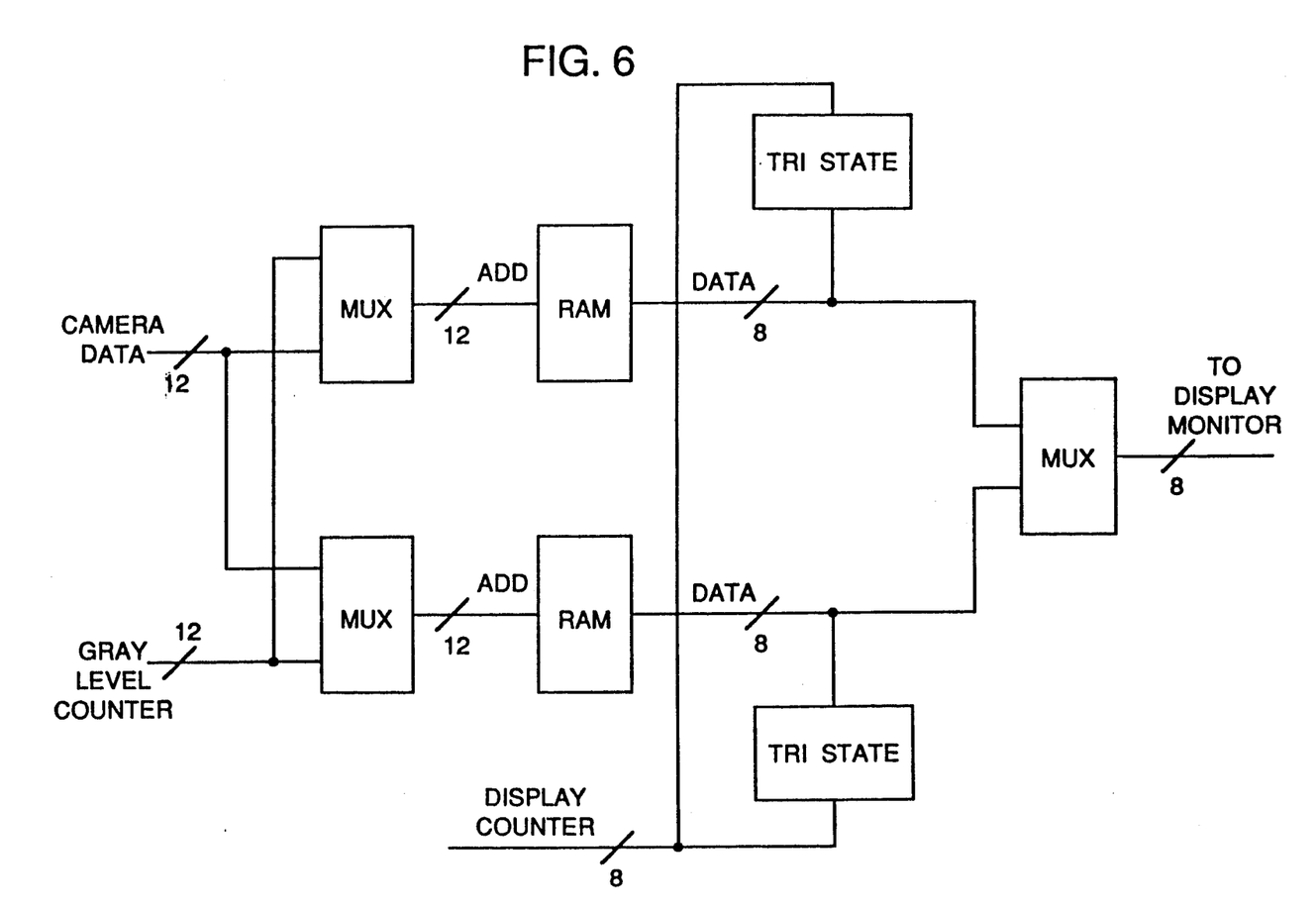
FIG. 6 is a block diagram of an IR signal processing system which presents mapped and projected IR data from the camera to the display.

A flow chart is shown in FIG. 4; a block diagram of the hardware corresponding to this flow chart is given in FIG. 5; and a block diagram of the hardware (including the two RAM look-up tables) which displays the data stored in the frame buffer, is given in FIG. 6. A detailed description of flow of the implementation is given next.

With the start of a new frame, the gray level of each pixel is used as the address to a 4096 by 1 RAM which stores the binary histogram. The RAM is read to determine whether the gray level has been previously identified as an occupied level. If not, then the occupancy counter is incremented. In either case, a one is written to the binary histogram RAM. After a predetermined number of pixel values have been read in, the function of the processor switches over to the projection or mapping step, at which time the number of occupied levels N is stored in the occupancy counter.

In the first steps of projection mapping, the display counter is reset; the gray level counter is reset; and the accumulator is cleared. The gray level counter is used to address the binary histogram RAM. If the data in the RAM is low, i.e. the level is unoccupied, the value stored in the display level counter is written into one of the display RAMs and the gray level counter is incremented. If the RAM data is high, then 256 is added to the value stored in the accumulator latch and the sum is stored in the accumulator. After the data is latched in the accumulator, the number of occupied levels is subtracted from this value. If the result is positive, the new value is latched by the accumulator and the display level counter is incremented and another subtraction of the number of occupied levels is performed. Each time the quantity, (accumulator value - N), is positive, the display level counter is incremented and the resulting new value is latched by the accumulator. Once the resulting value is negative, the process is suspended; the value of the display level counter is written to one of the display RAMs; the gray level counter is incremented and the process resumes. (The reader may find it helpful to trace the specific cases of 100 and 400 occupied levels through the above mapping process. Note that, in essence, the required integer divisions for the 12 to 8-bit mapping are being performed by means of successive subtractions.)

During the frame while the above operations are performed, the data is also being stored in a frame buffer. During the subsequent frame, this pixel data is read from the frame buffer and used as an address for the second display RAM. (Two display RAMs are used so that while one is being written the other can be read). The mapping from the 12-bit pixel data to the 8-bit display value is read from this display RAM. The 8-bit value is then D/A converted to an analog signal and formatted for RS-170 output.

The main advantage of the invention lies in the automatic tracking and optimization of the scene information which replaces the need for constant and laborious updating of the manual offset and gain adjustment as the scene changes or the camera is panned. This is of great value in actual field operation. A secondary advantage is that for some wide dynamic range scenes, all the scene details from the darkest to the brightest regions are better seen at the same time on the automated image than on the manually adjusted image. This reflects both the subtle eye-guided skill required to "tune" the image properly and the linear nature of the tuning which wastes, so to speak, dynamic range on empty levels within the histogram.

The advantage of the HP algorithm for automatic display of IR scenes as compared to the main alternative candidate, histogram equalization, has already been described above. To reiterate, two unfortunate tendencies of histogram equalization are avoided by the new algorithm: the amplification of shot noise through exaggerated contrast at the background levels, and the loss of image detail for smaller objects in the scene.

Figure 7:
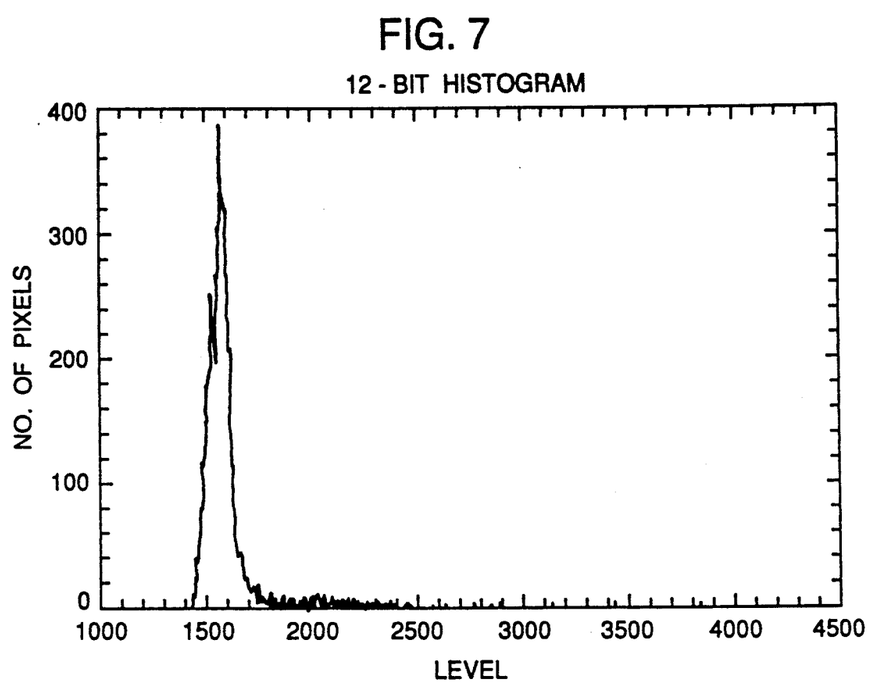
FIG. 7 is a chart which displays the characteristics in histogram form of 12 bit data signals produced by IR cameras.
Figure 8:
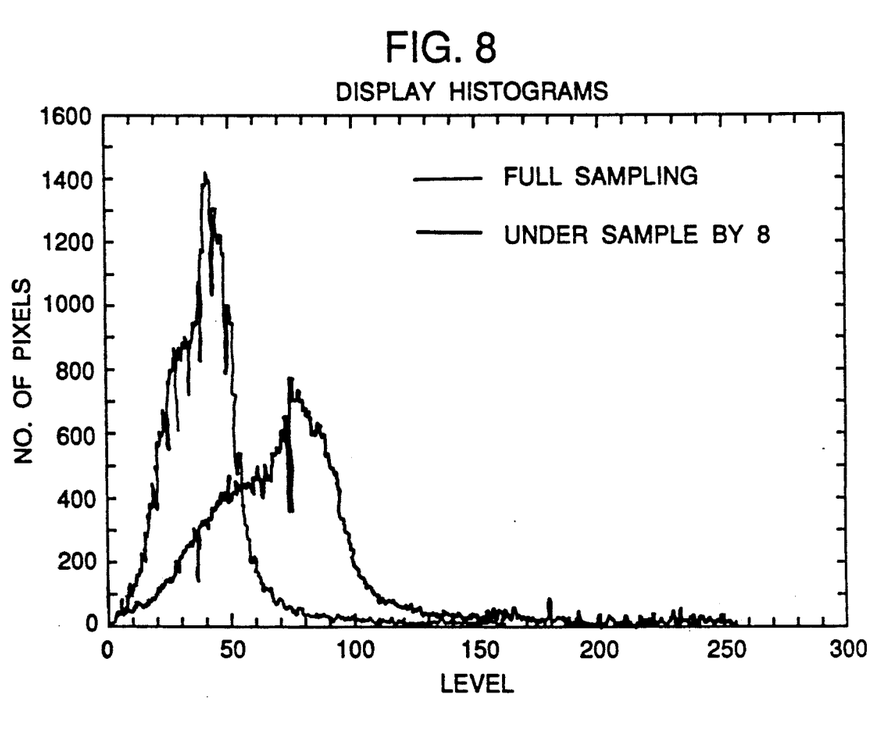
FIG. 8 is a chart of the display histogram after processing by the present invention.

A final feature and potential advantage of the new algorithm lies in the simple manner that one can gradually and automatically increase the dynamic range assigned to the majority pixel levels (typically the background such as foliage or ground) by incorporating an undersampling switch. In its basic embodiment, the HP algorithm entails sampling each pixel in the image to determine the binary histogram. If instead, one undersamples (for example if one uses every second, or fourth, or eighth, etc., pixel), one gradually increases the dynamic range assigned in the display to majority pixel levels. FIGS. 7 and 8 illustrate the effects of such subsampling. FIG. 7 shows the raw or 12-bit histogram of the image. FIG. 8 shows the display histograms after processing with the HP algorithm with every pixel sampled and with every eighth pixel sampled. Note that the main peak is assigned greater range in the under sampled case. Further software simulations indicate that for scenes with very wide complex histograms, some degree of undersampling every 4th, 8th or 16th) optimizes the display. This could make a virtue out of necessity as the throughput demands of full sampling become problematic with large arrays (512 by 512 or larger) and faster frame rates. The software code for the algorithm is presented below in Table 1.

Many variations in implementation are conceivable such as updating the binary histogram every other frame in displaying each frame. Further, one could implement with a undersampling switch as described above to allow the operator to adopt to the requirements of the scene or application while still retaining the automatic adjustment which is the crux of the invention.

TABLE 1
SOFTWARE CODE FOR ALGORITHM

```
#include "defs.h"
#include "extern_defs.h"
do_histo(hdata)
unsigned short hdata[];
        int plot[4096];
        int i,j, store,level,n_occ;
/*initialize all local variables to zero, if this
   isn't done then plot[] will seems to end up with
   some anomalous values in a few places that should
   contain 0s.*/
n_occ=0; store=0; level=0;
        for (i=0; i 4096;i++) plot[i]=0;
/* develop binary version of plot*/
        for(i=0; i HEIGHT*WIDTH; i++)
                j = hdata[i];
                plot[i] = 1;
/*add up levels*/
        for(j=0;j 4096;j++)
        store += plot[i];
        n_occ = store;
/* order from 1 to n_occ*/
        store = 1;
        for(j=0;j 4096;j++)
                if(plot[j] == 1)
                        plot[j] = store;
                        store++;
/* scale data from 0 to 255*/
        for(i=0; i WIDTH*HEIGHT;i++)
        level = plot[ hdata[i] ;
        output[i] = (256 * (level − 1))/(n_occ );
```

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An IR signal processing system which provides automatic mapping of IR data signals into mapped display signals which have adjusted dynamic range, said IR signal processing system comprising:

a means for producing said IR data signals with 12 bit levels of intensity;

a means for selectively undersampling the IR data signals of the producing means by selecting a dynamic range using less that 100% of occupied pixel levels represented in the IR data signals, said undersampling means outputting thereby a set of undersampled IR data signals;

a means for mapping said undersampled IR data signals with mapped display values to output said mapped display signals with 8 bit levels of intensity; and a means for displaying said mapped display signals with 8 bit levels of intensity, said displaying means being electrically connected with said mapping means to receive said mapped display signals therefrom.

2. An IR signal processing system, as defined in claim 1, wherein said producing means includes an infrared camera which outputs said IR display with 12 bit levels of intensity.

3. An IR signal processing system, as defined in claim 2, wherein said mapping means comprises a microprocessor which has been programmed with a histogram projection algorithm which causes said microprocessor to determine a binary histogram by counting all occupied levels in said IR data signals and determining therefrom a look-up conversion table, said microprocessor then mapping IR display signals with said mapped display values to output thereby said mapped display signals with said adjusted dynamic range.

4. An IR signal processing system, as defined in claim 3, wherein said displaying means comprises an 8 bit monitor which is electrically connected with said mapping means to receive said mapped display signals therefrom.

5. An IR signal processing system as defined in claim 4, wherein said microprocessor comprises a digital computer which has been programmed with a histogram projection algorithm which includes:

```
                int plot 4096 ;
                int i,j, store,level,n_occ;
n_occ=0; store=0; level=0;
        for (i=0; i 4096;i++) plot i =0;
/* develop binary version of plot*/
        for(i=0; i HEIGHT*WIDTH; i++)
                j = hdata[i];
                plot[i] = 1;
é
/*add up levels*/
        for(j=0;j 4096;j++)
        store += plot[i];
        n_occ = store;
/* order from 1 to n_occ*/
        store = 1;
        for(j=0;j 4096;j++)
                if(plot[i] == 1)
                        plot[i] = store;
                        store++;
/* scale data from 0 to 255*/
for(i=0; i WIDTH*HEIGHT;i++)
        level = plot[ hdata[i] ];
        output[i] = (256 * (level − 1))/(n_occ)
```

6. An IR signal processing system, as defined in claim 3, wherein said microprocessor comprises a digital computer which has been programmed with a histogram projection algorithm which includes:

```
                int plot 4096 ;
                int i,j, store,level,n_occ;
n_occ=0; store=0; level=0;
        for (i=0; i 4096;i++) plot i =0;
/* develop binary version of plot*/
        for(i=0; i HEIGHT*WIDTH; i++)
                j = hdata[i];
                plot[i] = 1;
/*add up levels*/
        for(j=0;j 4096;j++)
        store += plot[i];
        n_occ = store;
/* order from 1 to n_occ*/
        store = 1;
        for(j=0;j 4096;j++)
                if(plot[i] == 1)
                        plot[i] = store;
                        store++;
/* scale data from 0 to 255*/
for(i=0; i WIDTH*HEIGHT;i++)
        level = plot[ hdata[i] ];
        output[i] = (256 * (level − 1))/(n_occ)
```

7. An IR signal processing system, as defined in claim 2, wherein said displaying means comprises an 8 bit monitor which is electrically connected with said mapping means to receive said mapped display signals therefrom.

8. An IR signal processing system, as defined in claim 2 wherein said mapping means comprises a computer which has been programmed. to map said IR data signals which have 12 bit levels of intensity into 8 bit levels while undersampling by various degrees to increase the dynamic range of signals of interest.

9. An IR signal processing system, as defined in claim 1, wherein said mapping means comprises a microprocessor which has been programmed with a histogram projection algorithm which causes said microprocessor to determine a binary histogram by counting all occupied levels in said IR data signals and determining therefrom a look-up conversion table, said microprocessor then mapping IR display signals with said mapped display values to output thereby said mapped display signals with said adjusted dynamic range.

10. An IR signal processing system, as defined in claim 9, wherein said displaying means comprises an 8 bit monitor which is electrically connected with said mapping means to receive said mapped display signals therefrom.

11. An IR signal processing system as defined in claim 10, wherein said microprocessor comprises a digital computer which has been programmed with a histogram projection algorithm which includes:

```
                int plot 4096 ;
                int i,j, store,level,n_occ;
n_occ=0; store=0; level=0;
        for (i=0; i 4096;i++) plot i =0;
/* develop binary version of plot*/
        for(i=0; i HEIGHT*WIDTH; i++)
                j = hdata[i];
                plot[i] = 1;
/*add up levels*/
        for(j=0;j 4096;j++)
        store += plot[i];
        n_occ = store;
/* order from 1 to n_occ*/
        store = 1;
        for(j=0;j 4096;j++)
                if(plot[i] == 1)
                        plot[i] = store;
                        store++;
/* scale data from 0 to 255*/
```

-continued
```
        for(i=0; i WIDTH*HEIGHT;i++)
            level = plot[ hdata[i] ];
            output[i] = (256 * (level − 1))/(n_occ)
```

12. An IR signal processing system, as defined in claim 9, wherein said microprocessor comprises a digital computer which has been programmed with a histogram projection algorithm which includes:

```
        int plot 4096 ;
        int i,j, store,level,n_occ;
n_occ=0; store=0; level=0;
        for (i=0; i 4096;i++) plot i =0;
/* develop binary version of plot*/
        for(i=0; i HEIGHT*WIDTH; i++)
                j = hdata[i];
                plot[i] = 1;
/*add up levels*/
        for(j=0;j 4096;j++)
        store += plot[i];
                n_occ = store;
/* order from 1 to n_occ*/
        store = 1;
        for(j=0;j 4096;j++)
                if(plot[i] == 1)
                        plot[i] = store;
                        store++;
/* scale data from 0 to 255*/
for(i=0; i WIDTH*HEIGHT;i++)
        level = plot[ hdata[i] ];
        output[i] = (256 * (level − 1))/(n_occ)
```

13. An IR signal processing system, as defined in claim 9 wherein said mapping means comprises a computer which has been programmed to map said IR data signals which have 12 bit levels of intensity into 8 bit levels while undersampling by various degrees to increase the dynamic range of signals of interest.

14. An IR signal processing system, as defined in claim 1, wherein said displaying means comprises an 8 bit monitor which is electrically connected with said mapping means to receive said mapped display signals therefrom.

15. An IR signal processing system, as defined in claim 1 wherein said mapping means comprises a computer which has been programmed to map said IR data signals which ave 12 bit levels of intensity into 8 bit levels while undersampling by various degrees to increase the dynamic range of signals of interest.

16. An IR signal processing system, as defined in claim 1 wherein said mapping means comprises a computer which has been programmed to map said IR data signals which have 12 bit levels of intensity into 8 bit levels while assigning a common output display level to the most sparsely occupied levels while projecting the remainder into mapped level with 8 bit levels of intensity, said IR signal display system producing thereby an extended dynamic range about objects of interest in a scene.

17. An IR signal process which provides automatic mapping of IR data signals into mapped display signals which have adjusted dynamic range, said IR signal process comprising the steps of:
producing 12 bit IR data signals with an infrared camera;
determining a binary histogram from said IR data signals by counting all occupied pixel levels in said IR data signals to produce a sum N which characterizes said R data signals;
assigning said 12 bit R data signals into a set of 8 bit IR display signals by correlating each set of four 12 bit IR data signals with a single 8 bit R display signal;
writing a look-up conversion table to convert IR data signals levels into values for said IR display signal levels by assigning each the level a value of $255 \times n/N$ where N equals said occupied pixel levels in said IR data produced by said infrared camera and n equals a level of intensity for 12 bit IR data signals, such that n is a number selected from a range which extends between 0 and 4095 ; and
displaying said mapped display signals.

18. An IR signal process which provides automatic mapping of IR data signals into mapped display signals which have adjusted dynamic range, said IR signal process comprising the steps of
producing said IR data signals;
determining a binary histogram from said IR data signals by counting all occupied pixel levels in said IR data signals to produce a sum N which characterizes said IR data signals;
assigning said 12 bit R data signals into a set of 8 bit IR display signals by correlating each set of four 12 bit IR data signals with a single 8 bit IR display signal;
writing a look-up conversion table to convert IR data signal levels into values for said IR display signal levels by assigning each the level a value of $255 \times n/N$ where N equals said occupied pixel levels in said IR data produced by said infrared camera and n equals a level of intensity for 12 bit IR data signals, such that n is a number selected from a range which extends between 0 and 4095;
outputting said mapped display signal by performing said conversion table for each single 8 bit IR display signal; and
displaying said mapped display signals.

19. An IR signal process, as defined in claim 18, wherein said producing step comprises producing 12 bit IR data signals with an infrared camera, and wherein said mapping step is accomplished by entering said 12 bit IR data signals into said computer which has been programmed with a histogram projection algorithm.

20. An IR signal processing system which provides automatic mapping of IR data signals into mapped display signals which have adjusted dynamic range, said IR signal processing system comprising:
a means for producing said IR data signals with predetermined bit levels of intensity;
a means for selectively undersampling the IR data signals of the producing means by selecting a dynamic range using less than 100% of occupied pixel levels represented in the IR data signals, said undersampling means outputting thereby a set of undersampled IR data signals;
a means for mapping said undersampled IR data signals with mapped display values to output said mapped display signals with less than said predetermined bit levels of intensity; and
a means for displaying said mapped display signals with said less than said predetermined bit levels of intensity, said displaying means being electrically connected with said mapping means to receive said mapped display signals therefrom.

21. An IR signal processing system, as defined in claim 20, wherein said producing means includes an infrared camera which outputs said IR display signals with said predetermined bit levels of intensity.

22. An IR signal processing system, as defined in claim 21 wherein said mapping means comprises a microprocessor which has been programmed with a histogram projection algorithm which causes said microprocessor to determine a binary histogram by counting all occupied levels in said IR data signal signals and determining therefrom a look-up conversion table, said microprocessor then mapping IR display signals with said mapped display values to output thereby said mapped display signals with said adjusted dynamic range.

23. An IR signal processing system, as defined in claim 20, wherein said mapping means comprises a microprocessor which has been programmed with a histogram projection algorithm which causes said microprocessor to determine a binary histogram by counting all occupied levels in said IR data signals and determining therefrom a look-up conversion table, said microprocessor then mapping IR display signals with said mapped display values to output thereby said mapped display signals with said adjusted dynamic range.

* * * * *